United States Patent
Kim et al.

(10) Patent No.: US 8,280,231 B2
(45) Date of Patent: Oct. 2, 2012

(54) STORAGE MEDIUM STORING MOVING-IMAGE DATA THAT INCLUDES MODE INFORMATION, AND REPRODUCING APPARATUS AND METHOD

(75) Inventors: Kwang-min Kim, Anyang-si (KR);
Kil-soo Jung, Hwaseong-si (KR);
Man-seok Kang, Suwon-si (KR);
Sung-wook Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1209 days.

(21) Appl. No.: 10/964,811

(22) Filed: Oct. 15, 2004

(65) Prior Publication Data

US 2005/0111833 A1    May 26, 2005

(30) Foreign Application Priority Data

Oct. 17, 2003   (KR) .................. 10-2003-0072504

(51) Int. Cl.
*H04N 5/84* (2006.01)
*H04N 5/89* (2006.01)

(52) U.S. Cl. ...................... 386/332; 386/336

(58) Field of Classification Search ............ 386/1, 33, 386/45–46, 95–96, 125, 126, 332–336
See application file for complete search history.

(56) References Cited

U.S. PATENT DOCUMENTS

| | | | |
|---|---|---|---|
| 5,862,107 A * | 1/1999 | Goto ........................... | 386/361 |
| 5,909,551 A | 6/1999 | Tahara et al. | |
| 5,929,857 A | 7/1999 | Dinallo et al. | |
| 6,047,292 A | 4/2000 | Kelly et al. | |
| 6,128,712 A | 10/2000 | Hunt et al. | |
| 6,580,870 B1 * | 6/2003 | Kanazawa et al. .............. | 386/95 |
| 7,313,319 B2 * | 12/2007 | Miyauchi ...................... | 386/111 |
| 7,346,920 B2 * | 3/2008 | Lamkin et al. ................. | 725/112 |
| 2001/0056580 A1 | 12/2001 | Seo et al. | |
| 2002/0085833 A1 | 7/2002 | Miyauchi | |
| 2003/0086693 A1 | 5/2003 | Chung | |
| 2003/0123845 A1 | 7/2003 | Koda et al. | |
| 2003/0161615 A1 | 8/2003 | Tsumagari et al. | |
| 2004/0042763 A1 * | 3/2004 | Morita et al. ................... | 386/46 |
| 2007/0140653 A1 * | 6/2007 | Kozuka et al. .................. | 386/95 |

FOREIGN PATENT DOCUMENTS

EP          1 256 954           11/2002
(Continued)

OTHER PUBLICATIONS

Office Action and Search Report issued by Taiwanese Intellectual Property Office in Taiwanese Patent Application No. 093131109 on Sep. 30, 2008.
Communication issued by the European Patent Office on Jun. 12, 2009.
Korean Office Action issued on Feb. 25, 2010, in corresponding Korean Application No. 10-2003-0072504 (5 pages).

(Continued)

*Primary Examiner* — Thai Tran
*Assistant Examiner* — Nigar Chowdhury
(74) *Attorney, Agent, or Firm* — NSIP Law (57) ABSTRACT

A storage medium on which moving-image data including mode information is recorded, wherein the storage medium stores at least one object of a first type for reproducing moving-image information, at least one object of a second type for providing additional functions using the moving-image information and system data for controlling the reproduction of the objects of the first and second types. The system data includes mode information indicating the types of the objects.

22 Claims, 5 Drawing Sheets

FOREIGN PATENT DOCUMENTS

| | | |
|---|---|---|
| EP | 1 267 352 | 12/2002 |
| JP | 10-136314 | 5/1998 |
| JP | 10-162018 | 6/1998 |
| JP | 2003-216535 | 7/2003 |
| JP | 2003-249057 | 9/2003 |
| WO | WO 02/05104 | 1/2002 |
| WO | WO 2004/084212 | 9/2004 |

OTHER PUBLICATIONS

Japanese Office Action issued on Aug. 31, 2010, in corresponding Japanese Patent Application No. 2006-535269 (4 pages).

Extended European Search Report issued on Apr. 27, 2011, in counterpart European Application No. 10194612.7 (7 pages).

* cited by examiner

STORAGE MEDIUM STORING MOVING-IMAGE DATA THAT INCLUDES MODE INFORMATION, AND REPRODUCING APPARATUS AND METHOD

CROSS-REFERENCE TO RELATED APPLICATION

This application claims the benefit of Korean Patent Application No. 2003-72504, filed on Oct. 17, 2003, in the Korean Intellectual Property Office, the disclosure of which is incorporated herein in its entirety by reference.

BACKGROUND OF THE INVENTION

1. Field of the Invention

The present invention relates to the reproduction of data stored on a storage medium, and more particularly, to a storage medium storing moving-image data that includes mode information, and a reproducing apparatus and method.

2. Description of the Related Art

Moving-image data recorded on a conventional recording medium includes moving-image information that is compression-encoded and navigation information for controlling the reproduction of the moving-image information.

Specifically, moving-image information includes an audio-visual stream that includes video, audio and/or subtitles, which are encoded according to a motion picture experts group (MPEG) standard. Moving-image information may further include additional information, such as encoding properties of a moving-image stream or an entry point for random access, and a play list, which is an object for arranging the order of reproducing moving-images.

Navigation information includes navigation commands for controlling the reproduction of moving-image information. Examples of the navigation commands include a command to reproduce a play list and a command to jump to another play list.

Generally, navigation information is stored in a table of binary code. Moving-image information can be reproduced with reference to navigation information stored in a storage medium, and a user can watch a high-quality moving-image such as a movie. A group of such navigation commands is called a movie object.

However, programs providing an interactive function, such as games or chatting services, cannot be recorded on the conventional storage medium together with moving-image information. In addition, the conventional storage medium cannot record applications providing a browsing function for retrieving information related to a moving-image being reproduced from a markup document and displaying the information.

In other words, the conventional storage medium on which moving-images are recorded cannot provide additional functions, such as a program function offering interaction with a user and a browsing function for reproducing information related to a moving-image from a markup document.

SUMMARY OF THE INVENTION

The present invention provides a storage medium storing moving-image data that includes mode information, and a reproducing apparatus and method.

According to an aspect of the present invention, there is provided a storage medium on which data is stored and read by a computer. The data includes at least one object of a first type for reproducing moving-image information; at least one object of a second type for providing additional functions using the moving-image information; and system data for controlling the reproduction of the objects of the first and second types. The system data includes mode information indicating the types of the objects.

The objects of the first type may include the moving-image information that is compression-encoded and navigation information for controlling the reproduction of the moving-image information.

The objects of the second type may further include program data for providing interactive functions. The program data may provide at least one of a game function using a moving-image, a function of displaying a director's commentary while reproducing a portion of the moving-image, a function of displaying information related to the moving-image while reproducing a portion of the moving-image, or a chatting function while reproducing the moving-image. The program data may include an application program interface function for reproducing the moving-image information.

The objects of the second type may include browser data for retrieving information related to a moving-image from a markup document that stores the information and reproducing the information. The browser data may include at least one command implemented in markup language or/and execution script language for retrieving the information from the markup document and reproducing the information.

The system data may include start-up information indicating a position of an object to be first reproduced, and title information for each object. The title information may include entry point information indicating the position of each object and the mode information indicating a mode of each object, and the modes may be classified into a core mode corresponding to the first type, and a browser mode and a program mode corresponding to the second type, according to the types of the objects to be reproduced.

The storage medium can be inserted into or removed from a reproducing apparatus and may be an optical disk from which data can be read and/or recorded using an optical device included in the reproducing apparatus.

According to another aspect of the invention, there is provided a reproducing apparatus reproducing moving-image information recorded on a storage medium. The apparatus includes a reader reading at least one object of a first type for reproducing the moving-image information, at least one object of a second type for providing additional functions using the moving-image information, and system data including mode information indicating types of objects and information for controlling the reproduction of the objects of the first and second types; and a reproducer reproducing each object based on the read mode information.

According to another aspect of the invention, there is provided a buffer temporarily storing the objects and data read by the reader, and the reproducer may include an application manager controlling the reproduction of each object based on the system data and a blender overlaying images created as a result of reproducing each object into one image.

The reproducer may include a presentation engine decoding the moving-image information, which is compression-encoded and included in the objects of the first type, and reproducing the moving-image information; and a navigation engine controlling the presentation engine based on navigation information for controlling the reproduction of the moving-image information included in the objects of the first type.

The reproducer may include a program engine interpreting program data, which is included in the objects of the second type and is used for providing interactive functions, and executing programs for providing the interactive functions.

The reproducer may further include a browser engine interpreting browser data, which is included in the objects of the second type and is used for retrieving information related to the moving-image from a markup document that stores the information and reproducing the information, the browser engine retrieving the information related to the moving-image from the markup document that stores the information, and reproducing the information.

The application manager may include a user input processor processing user input information and transmitting the user input information to the navigation engine and the presentation engine when the mode information indicates the core mode, to the program engine when the mode information indicates the program mode, and to the browser engine when the mode information indicates the browser mode.

The presentation engine, the browser engine, and the program engine may include a user input executor reproducing the objects using the user input information received from the application manager.

According to another aspect of the invention, there is provided a method of reproducing moving-image information recorded on a storage medium. The method includes reading mode information from the storage medium comprising at least one object of a first type for reproducing the moving-image information, at least one object of a second type for providing additional functions using the moving-image information, and system data for controlling the reproduction of the objects of the first and second types and including the mode information indicating types of the objects; determining the type of an object to be reproduced based on the read mode information; and reproducing the object based on the result of the determination.

The method may further include receiving user input information while reproducing the object; and transmitting the user input information to the engine based on the mode information of the object being reproduced and controlling the reproduction of the object.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

A storage medium according to an aspect of the invention may include program data and/or browser data to provide additional functions using moving-image information recorded thereon in addition to reproducing moving-image information and navigation information (hereinafter called "core data") to reproduce moving-images. The storage medium may further include system data that includes mode information indicating types of objects to be reproduced and is required to control the reproduction of each object recorded thereon.

Figure 1:
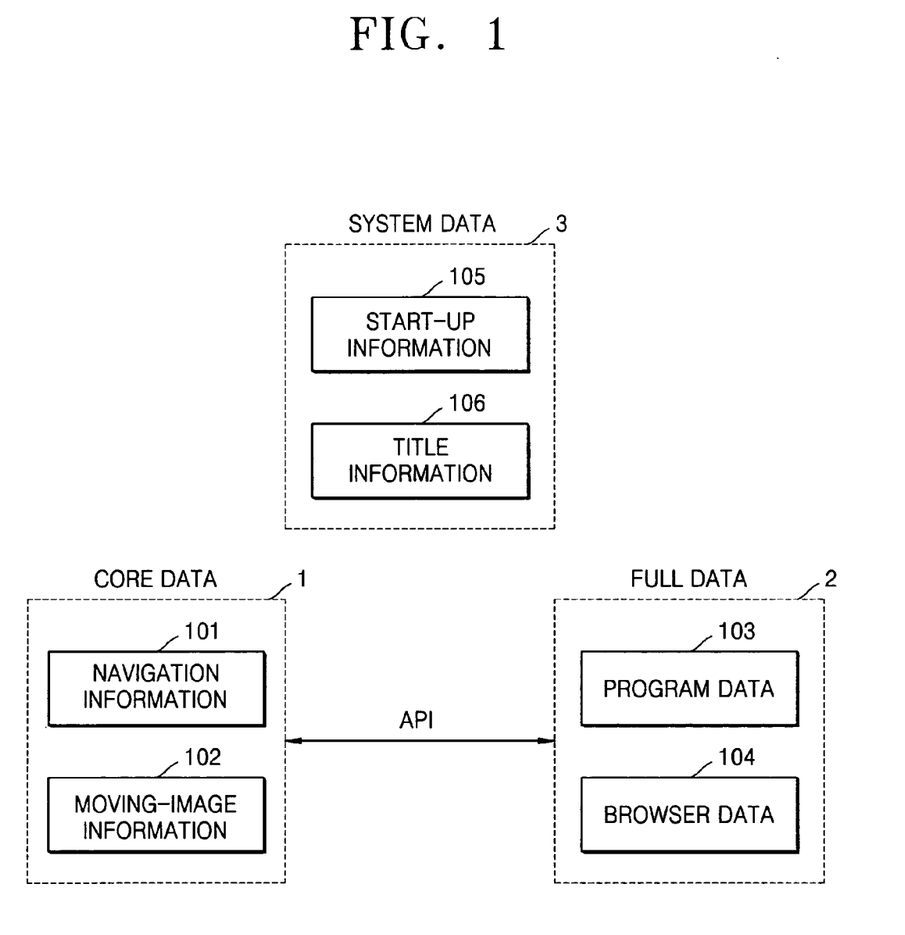
FIG. 1 illustrates types of data recorded on a storage medium according to an embodiment of the invention.

FIG. 1 illustrates types of data recorded on the storage medium according to an aspect of the invention. Referring to FIG. 1, the storage medium has core data 1, full data 2, and system data 3 recorded thereon.

The core data 1 is used for reproducing moving-images. The storage medium has at least one object of the core data type recorded thereon for reproducing moving-image information. The core data 1 includes moving-image information 102 that is compression-encoded and navigation information 101 for controlling the reproduction of the moving-image information 102. Therefore, the moving-image information 102 can be reproduced with reference to the navigation information 101 stored in the storage medium, and a user can watch high-quality moving-images such as movies.

The full data 2 is used to provide extra functions in addition to reproducing moving-images. The full data 2 may include program data 103 for providing interactive functions and/or browser data 104 for retrieving information related to a moving-image from a markup document that stores the information and reproducing the information.

The program data 103 may include at least one object that provides a function using moving-images, such as a game function, a function of displaying text while reproducing a portion of a moving-image, such as a director's commentary, a function of displaying additional information while reproducing a portion of a moving-image, or a chatting function while reproducing a moving-image, such as a text-messaging function. To execute a program while reproducing a moving-image, the program data 103 may include an application program interface (API) function for a presentation engine that reproduces moving-image information.

The browser data 104 may include at least one object that includes commands for retrieving information related to a moving-image from a markup document storing the information and commands for reproducing the information. The commands may be markup language and/or execution script language (for example, ECMA scripts). Accordingly, information related to a moving-image can be retrieved from a markup document storing the information and reproduced together with the moving-image.

For example, when a movie has been recorded on the storage medium, information related to the movie, such as the latest news about actors/actresses starring in the movie, events related to the movie, or updated subtitles, which are stored on a web page or in a file, can be retrieved and reproduced together with the movie. The full data 2 may also include other data types for providing additional functions other than reproducing moving-images.

The system data 3 includes start-up information 105 and title information 106. The start-up information 105 indicates the position of an object to be first reproduced by a reproducing apparatus. For example, the start-up information 105 indicates, out of a plurality of objects of the core data 1, the program data 103, and/or the browser data 104 stored in the storage medium, the position of an object that will be first reproduced when the storage medium is inserted into the reproducing apparatus.

The title information 106 includes entry point information indicating the position of each object to be reproduced. Further, the title information 106 may include mode information indicating the data type of each object. Mode information can be classified into a core mode, a browser mode, and a program mode according to the data types of objects.

Figure 2:
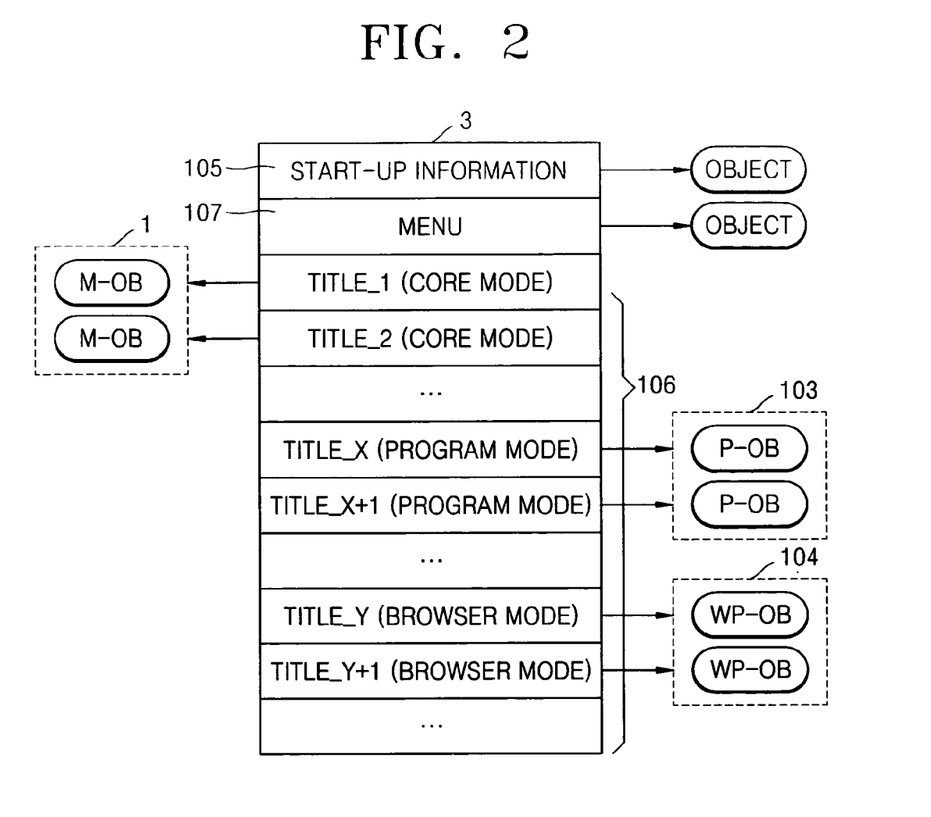
FIG. 2 illustrates a structure of system data illustrated in FIG. 1.

FIG. 2 illustrates a structure of the system data 3 illustrated in FIG. 1. Referring to FIG. 2, the system information 3 includes the start-up information 105 and the title information 106. The system information 3 may further include menu information 107 for displaying menus on a screen.

The start-up information 105 indicates the position of an object to be first reproduced by a reproducing apparatus. The start-up information 105 indicates the address of one of the objects of the core data 1, the program data 103 and/or the browser data 104.

The title information 106 includes control information (title_1 . . . title_X+1 . . . title_Y+1) needed to reproduce at least one object (M-OB, P-OB, WP-OB, etc.). Objects indicated by the title information 106 may be classified into core-mode objects (included in the core data 1 and hereinafter called "movie objects"), program-mode objects (included in the program data 103 and hereinafter called "program objects"), and/or browser-mode objects (included in the browser data 104 and hereinafter called "web page" objects), according to the object functions.

The movie objects respectively include a plurality of navigation commands for reproducing moving-image information and can be stored in a binary code table. Each of the movie objects includes an identification number, which is an entry pointer indicated by the title information 106. The program objects respectively include programs for providing interactive functions, wherein the file names of the programs may be entry pointers. The web page objects respectively include commands implemented in markup language and/or execution script language, and the file name of a markup document can be an entry pointer.

The title information 106 includes entry point information indicating the position of each object. The title information 106 includes the entry point information indicating the position of each object to be reproduced and mode information indicating the type of each object.

Since each object indicates the position of another object, the objects may be consecutively reproduced. When objects to be reproduced are of the same type, they are reproduced by a reproducing engine without mode conversion. However, when the objects are of different types, mode conversion is required since each object must be reproduced by a different reproducing engine, and a reproducing engine for an object cannot directly call another object in a different mode. In other words, when a reproducing engine is activated (that is, a mode is converted), the activated reproducing engine reproduces a corresponding object.

Figure 3:
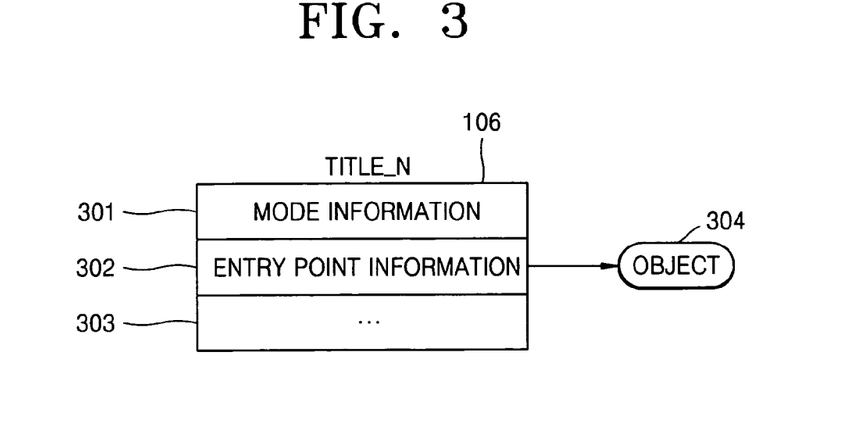
FIG. 3 illustrates a structure of title information included in the system data according to an embodiment of the invention.

FIG. 3 illustrates a structure of the title information 106 included in the system data 3 according to an aspect of the invention. Referring to FIG. 3, the title information 106 includes mode information 301 and entry point information 302. The mode information 301 can be classified into a core mode, a browser mode, and a program mode according to types of objects to be reproduced. The entry point information 302 indicates the position of an object 304. For example, the object 304 may be located using the entry point information 302 and then reproduced.

As described above, the storage medium stores program data and/or browser data for providing extra functions as well as core data for reproducing moving-images. The storage medium may additionally store system data including mode information for controlling the reproduction of the moving-images. Accordingly, the storage medium can provide a variety of additional functions other than reproducing moving-images. For example, games using moving-images, chatting services, or information related to the moving-images posted on web pages can be provided.

The storage medium may be inserted into or removed from a reproducing apparatus and may be an optical disk that is read by an optical device of the reproducing apparatus. For example, the storage medium may be a CD-ROM, a DVD, or another type of disk.

Figure 4:
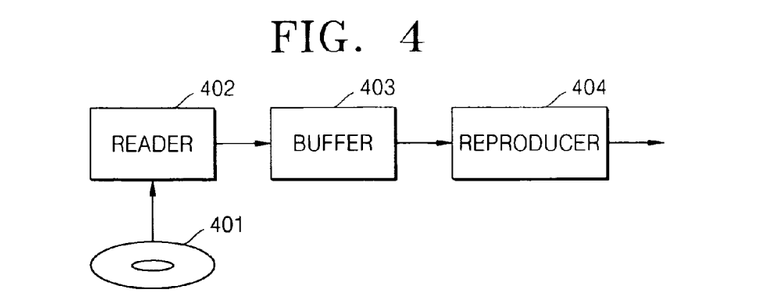
FIG. 4 is a schematic block diagram of a reproducing apparatus according to an embodiment of the invention.

A reproducing apparatus for reproducing data stored in a storage medium 401 will now be described. FIG. 4 is a schematic block diagram of the reproducing apparatus according to an aspect of the invention. Referring to FIG. 4, the reproducing apparatus includes a reader 402, a buffer 403, and a reproducer 404.

The reader 402 reads data from the storage medium 401. According to another aspect of the invention, when the storage medium 401 is an optical disk, the reproducing apparatus includes an optical device that reads data from the optical disk.

The buffer 403 stores the data read by the reader 402. The storage may be temporary. The reproducer 404 reproduces an object using a reproducing engine that corresponds to the object based on the mode information of the object. Then, data reproduced by the reproducing engine is displayed on a display device (not shown).

Figure 5:
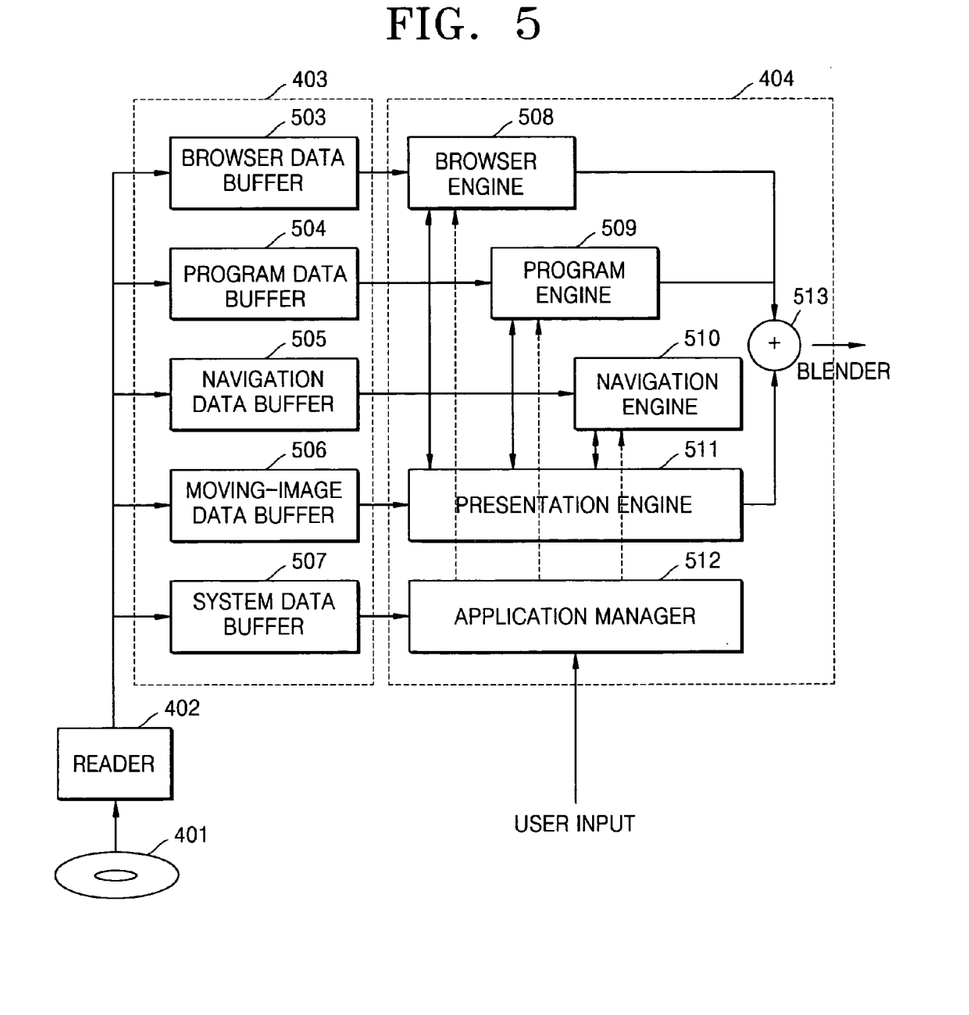
FIG. 5 is a detailed block diagram of a buffer and a reproducer illustrated in FIG. 4.

FIG. 5 is a detailed block diagram of the buffer 403 and the reproducer 404 illustrated in FIG. 4. Referring to FIG. 5, the buffer 403 stores data that is read in a browser data buffer 503, a program data buffer 504, a navigation data buffer 505, a moving-image data buffer 506, and a system data buffer 507 according to the type of data read.

The reproducer 404 includes reproducing engines, an application manager 512, and a blender 513. The reproducing engines have respective reproducing functions that are used according to the types of data temporarily stored. Specifically, the reproducing engines include a browser engine 508, a program engine 509, a navigation engine 510, and/or a presentation engine 511.

The browser engine 508 receives the browser data 104 from the browser data buffer 503, and retrieves information related to moving-image information from a markup document and reproduces the related information. In other words, the browser engine 508 executes a command implemented in a markup language or an execution script language included in the browser data 104. Accordingly, the information related to the moving-image information may be retrieved from the markup document and then reproduced.

The program engine 509 receives the program data 103 from the program data buffer 504 and provides an interactive function. For example, the program engine 509 executes a game, chatting, or director's commentary program. Therefore, it is possible to interact with users using moving-images.

The browser engine 508 or the program engine 509 may provide additional functions with moving-images using an API function for the presentation engine 511 that reproduces moving-images.

The navigation engine 510 receives navigation data from the navigation data buffer 505 and controls the reproduction of moving-image stream data. The presentation engine 511 that reproduces moving-images may be controlled by using the API function which includes commands for reproducing moving-images.

The presentation engine 511 receives the moving-image stream data from the moving-image data buffer 506, and decodes and reproduces the compression-encoded moving-image.

The application manager 512 receives the system data 3 from the system data buffer 507 and controls the reproducing engines to reproduce moving-images and provide additional functions. For example, the application manager 512 locates an object to be first reproduced using the start-up information 105 and reproduces the object. The data types of objects are determined based on the mode information 301 included in the title information 106 of the system data 3, and the reproducing engines corresponding to the data types are activated. The objects are located using the entry point information 302 included in the title information 106 of the system data 3 and reproduced by the activated reproducing engines, respectively.

Referring to FIG. 2, for example, when reproducing title_1 with reference to the system data 3, the application manager 512 reads the mode information 301 included in the title information 106 of the title_1 from the system data buffer 507 and, when the application manger determines that the mode information 301 indicates the core mode, the activation manager activates the presentation engine 511 and the navigation engine 510. The application manager 512 finds the position of an object based on the entry point information 302 contained in the title information 106 and reproduces the object.

When reproducing title_Y, the application manager 512 reads the mode information 301 included in the title information 106 of the title_Y and activates the browser engine 508 when the activation manager determines that the mode information 301 indicates the browser mode. The application manager 512 locates an object based on the entry point information 302 included in the title information 106 and reproduces the object.

The blender 513 overlays graphics reproduced by the browser engine 508, the program engine 509 and/or the presentation engine 511 into one image and outputs the image. Hence, while a moving-image is being reproduced, additional functions, such as the browsing function or the program function, can be provided.

A method of providing the interactive function after receiving a user input while reproducing moving-images will now be described.

Figure 6:
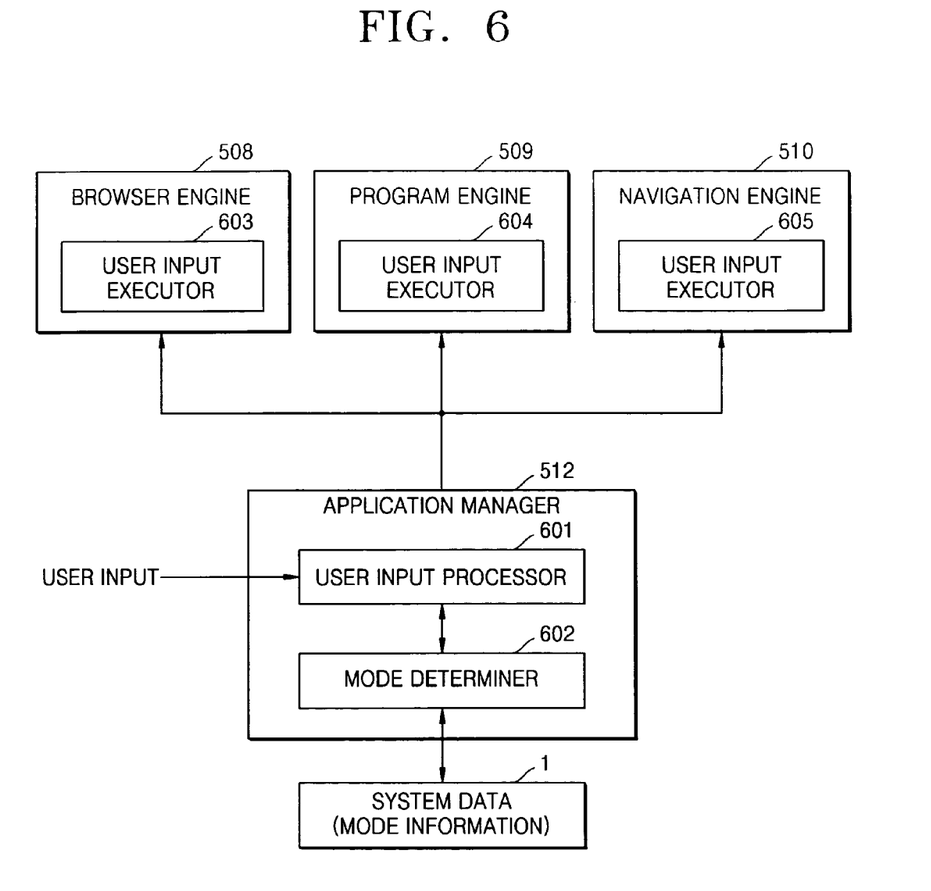
FIG. 6 is a detailed block diagram of a reproducing apparatus according to an embodiment of the invention.

FIG. 6 is a detailed block diagram of a reproducing apparatus according to an aspect of the invention. Referring to FIG. 6, the application manager 512 includes a user input processor 601 processing information input by a user and a mode determiner 602 determining the data type of an object by reading the mode information 301 included in the title information 106 of the system data 3.

The application manager 512 converts user input information received from the user input processor 601 into a command that a reproducing engine corresponding to the mode information 301 read by the mode determiner 602 can execute and transmits the command to the reproducing engine.

The reproducing engine that receives the command executes the command using a user input executor included in the reproducing engine. For example, when the mode information 301 included in the title information 106 of an object being reproduced indicates the browser mode, the application manager 512 converts user input information into a command that can be executed by a user input executor 603 of the browser engine 508 and transmits the command to the browser engine 508. The same applies to other modes.

Accordingly, user requirements (user input information) are received while a moving-image is being reproduced, and the user requirements can be processed by a reproducing engine appropriate for the mode indicated by the mode information 301 of an object. Therefore, moving-images as well as interactive functions with users can be provided.

Figure 7:
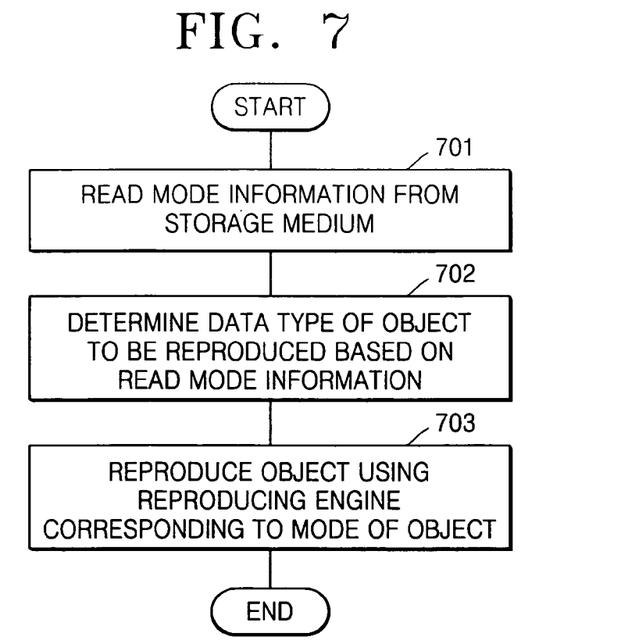
FIG. 7 is a flowchart illustrating a method of reproducing an object according to an embodiment of the invention.

A method of reproducing moving-image data that includes the mode information 301 will now be described. FIG. 7 is a flowchart illustrating a method of reproducing an object according to an aspect of the invention.

Referring to FIG. 7, the mode information 301 is read from the storage medium 401 (operation 701). The data type of each object to be reproduced is determined based on the read mode information 301 (operation 702). Each object is reproduced by a reproducing engine corresponding to the determined mode of each object (operation 703). The objects can be read during operation 701 or 703 to determine whether they are included in the core data 1, or the program data 103 and/or the browser data 104.

Specifically, at least one object of the core data 1 for reproducing moving-image information, at least one object of the full data 2 for providing additional functions using the moving-image information, and the system data 3 for controlling the reproduction of each of the objects are read from the storage medium 401 (operation 701). The system data 3 includes the mode information 301 indicating the types of objects to be reproduced. The full data 2 can be classified into the program data 103 and the browser data 104 according to functions of the objects included in the full data 2.

Based on the read mode information 301, it is determined whether the objects are included in the core data 1, the program data 103, or the browser data 104, respectively (operation 702). When an object is determined to be included in the core data 1, the object is reproduced by the navigation engine 510 and the presentation engine 511. When the object is determined to be included in the program data 103, the object is reproduced by the program engine 509. When the object is determined to be of the browser data type 104, the object is reproduced by the browser engine 508. The, reproduced images are blended into one image, which is displayed on a display screen (operation 703).

Figure 8:
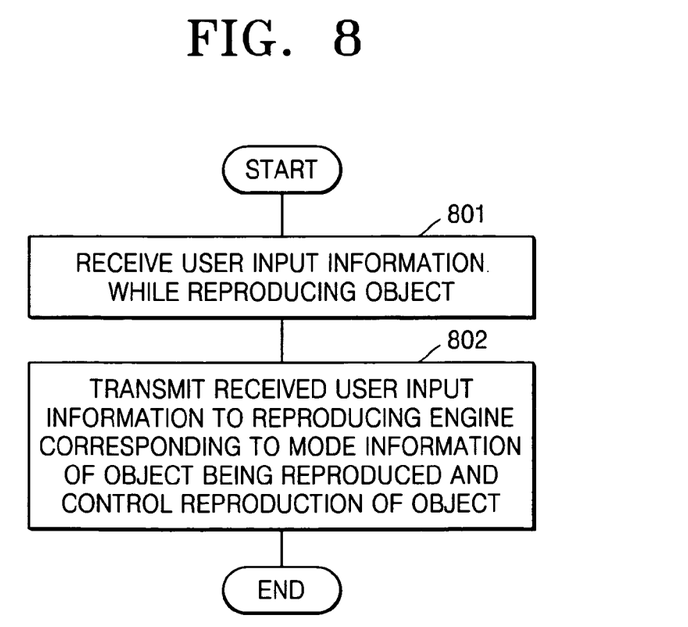
FIG. 8 is a flowchart illustrating a method of reproducing an object that enables interactions with a user according to an embodiment of the invention.

A method of processing a user input while a moving-image is being reproduced will now be described. FIG. 8 is a flowchart illustrating a method of reproducing an object that enables interaction with a user according to an aspect of the invention.

In operation 801, user input information is received while an object stored in the storage medium 401 is being reproduced. In operation 802, the received user input information is transmitted to a reproducing engine corresponding to a mode of the object that is determined based on the mode information 301, and the reproducing engine reproduces the object.

Specifically, in operation 801, user input information is received to reproduce an object stored in the storage medium 401 that contains the full data 2. the full data includes the program data 103 including at least one object for providing interactive functions and/or the browser data 104 including at least one object for retrieving information related to a moving-image from a markup document and reproducing the information.

According to the mode information 301 included in the system data 3 of an object being reproduced, it is determined whether the object is included in the core data 1, the browser data 104, or the program data 103. The user input information is converted into a command that a reproducing corresponding to the determined mode of the object can execute and the command is transmitted to the reproducing engine. In operation 802, the reproducing engine (the navigation engine 510 and the presentation engine 511), the browser engine 508, or the program engine 509) executes the command according to the user input information (operation 802). For example, the reproducing engine may reproduce the object based on the user input information.

According to another aspect of the invention, the method of reproducing moving image data while a moving image is being processed as shown in FIGS. 7 and 8, can be implemented as computer-readable code on a computer-readable recording medium. The computer-readable recording medium is any data storage device that can store data which can be thereafter read by at least one computer system. Examples of the computer-readable recording medium include read-only memory (ROM), random-access memory (RAM), CD-ROMs, magnetic tapes, floppy disks, optical data storage devices, and carrier waves (such as data transmission through the Internet).

According to another aspect of the invention, the computer-readable recording medium can also be distributed over network-coupled computer systems so that the computer-readable code is stored and executed in a distributed fashion.

As described above, according to an aspect of the invention, programs may be recorded that provide interactive functions, such as games using moving-images being reproduced or chatting services, on a storage medium together with moving-image information.

In addition, applications providing a browsing function for retrieving information related to a moving-image being reproduced from a markup document and displaying the information can be recorded on the storage medium together with the moving-image information.

Therefore, the aspects of the invention can provide additional functions, such as a program function for offering interaction and a browsing function for reproducing information related to a moving-image from a markup document.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-transitory computer-readable storage medium, implemented by a computer, on which data is stored, the data comprising:
   at least one object of a first type configured to reproduce moving-image information by the computer;
   at least one object of a second type configured to provide additional functions related to the moving-image information by the computer; and
   system data configured to be used by the computer to control the reproduction of the objects of the first and second types,
   wherein the system data comprises:
   information indicating an object to be automatically reproduced when the computer readable storage medium is loaded,
   menu information for displaying a menu, and
   title information
   comprising identification information of the corresponding object and mode information indicating to the computer the type of the corresponding object.

2. The non-transitory computer-readable storage medium as claimed in claim 1, wherein the objects of the first type comprise compression-encoded moving-image information and navigation information for controlling the reproduction of the moving-image information.

3. The non-transitory computer-readable storage medium as claimed in claim 1, wherein the objects of the second type comprise program data for providing interactive functions.

4. The non-transitory computer-readable storage medium as claimed in claim 3, wherein the program data provides at least one of: a game-type function using a moving-image, a function of displaying text while reproducing a portion of the moving-image, a function of displaying information related to the moving-image while reproducing a portion of the moving-image, and a text-messaging function while reproducing the moving-image.

5. The non-transitory computer-readable storage medium as claimed in claim 3, wherein the program data comprises an application program interface function for reproducing the moving-image information.

6. The non-transitory computer-readable storage medium as claimed in claim 1, wherein the objects of the second type comprise browser data for retrieving information related to a moving-image from a markup document that stores the information and reproducing the information.

7. The non-transitory computer-readable storage medium as claimed in claim 6, wherein the browser data comprises at least one command implemented in markup language and/or execution script language for retrieving the information from the markup document and reproducing the information.

8. The non-transitory computer-readable storage medium as claimed in claim 1, wherein the computer readable storage medium comprises an optical disk from which data can be read using an optical device that is included in the reproducing apparatus.

9. The non-transitory computer-readable storage medium as claimed in claim 1, wherein the identification information of the corresponding object comprises entry point information indicating a position of the corresponding object.

10. A reproducing apparatus reproducing data recorded on a storage medium comprising at least one of a first type object and a second type object, the apparatus comprising:
    a reader configured to:
       read system data configured to control the reproduction of the objects of the first and second types, the system data comprising:
       information indicating an object to be automatically reproduced when the storage medium is loaded;
       menu information configured to display a menu; and
       title information comprising:
          identification information of the corresponding object; and
          mode information indicating the type of the corresponding object; and
    a reproducer configured to reproduce object according to the system data.

11. The reproducing apparatus as claimed in claim 10, further comprising:

a buffer configured to store the objects and data read by the reader, wherein the reproducer comprises:

an application manager configured to control the reproduction of each object based on the system data, and a blender configured to overlay images created as a result of reproducing each object into one image.

12. The reproducing apparatus as claimed in claim 11, wherein the reproducer comprises:

a presentation engine configured to:

decode moving-image information, which is compression-encoded and included in the objects of the first type; and reproduce the moving-image information; and a navigation engine configured to control the presentation engine according to navigation information for controlling the reproduction of the moving-image information included in the objects of the first type.

13. The reproducing apparatus as claimed in claim 12, wherein the reproducer further comprises:

a program engine configured to:

interpret program data, the program data is included in the objects of the second type and is used for providing interactive functions; and execute programs configured to provide the interactive functions.

14. The reproducing apparatus as claimed in claim 13, wherein the program data comprises at least one program configured to provide at least one of:

a game type function using a moving-image, a function of displaying text while reproducing a portion of the moving-image, a function of displaying information related to the moving-image while reproducing a portion of the moving-image, and a text-messaging function while reproducing the moving-image.

15. The reproducing apparatus as claimed in claim 14, wherein the program data further comprises:

an application program interface function for the presentation engine configured to reproduce the moving-image information, wherein the program engine is further configured to execute the programs using moving-images reproduced by the presentation engine using the application program interface function.

16. The reproducing apparatus as claimed in claim 13, wherein the reproducer further comprises a browser engine configured to:

interpret browser data, the browser data being included in the objects of the second type and being used for retrieving information related to the moving-image from a markup document that stores the information and reproducing the information;

retrieve the information related to the moving-image from the markup document that stores the information; and reproduce the information.

17. The reproducing apparatus as claimed in claim 16, wherein the browser data comprises:

at least one command implemented in markup language and/or execution script language configured to:

retrieve the information from the markup document; and reproduce the information, wherein the browser engine is further configured to execute the at least one command.

18. The reproducing apparatus as claimed in claim 16, wherein:

the application manager comprises a user input processor configured to process user input information; and the application manager is further configured to:

transmit the user input information to the navigation engine and the presentation engine when the mode information indicates a core mode corresponding to the first type;

transmit the user input information to the program engine when the mode information indicates a program mode corresponding to the second type; and transmit the user information to the browser engine when the mode information indicates a browser mode corresponding to the second type.

19. The reproducing apparatus as claimed in claim 18, wherein the presentation engine, the browser engine, and the program engine each comprise a user input executor configured to reproduce the objects using the user input information received from the application manager.

20. The reproducing apparatus of claim 11, further comprising:

a location for the storage medium to be inserted or removed, wherein the apparatus is configured to reproduce data stored in the storage medium.

21. The reproducing apparatus as claimed in claim 20, further comprising an optical reader device configured to read data recorded on an optical disk and to reproduce the data.

22. The reproducing apparatus as claimed in claim 10, wherein the identification information of the corresponding object comprises entry point information indicating a position of the corresponding object.

* * * * *